United States Patent Office 3,564,910
Patented Feb. 23, 1971

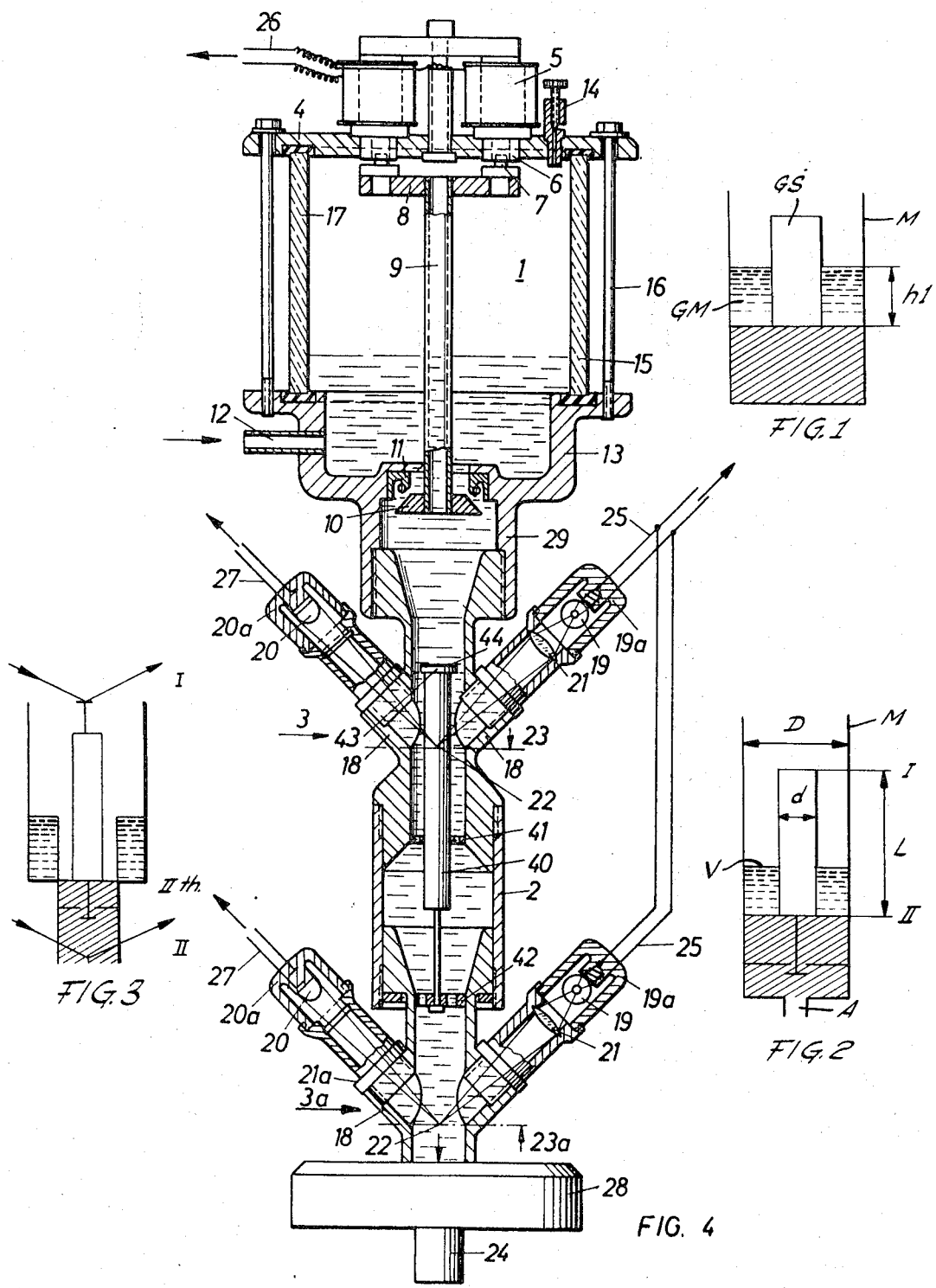

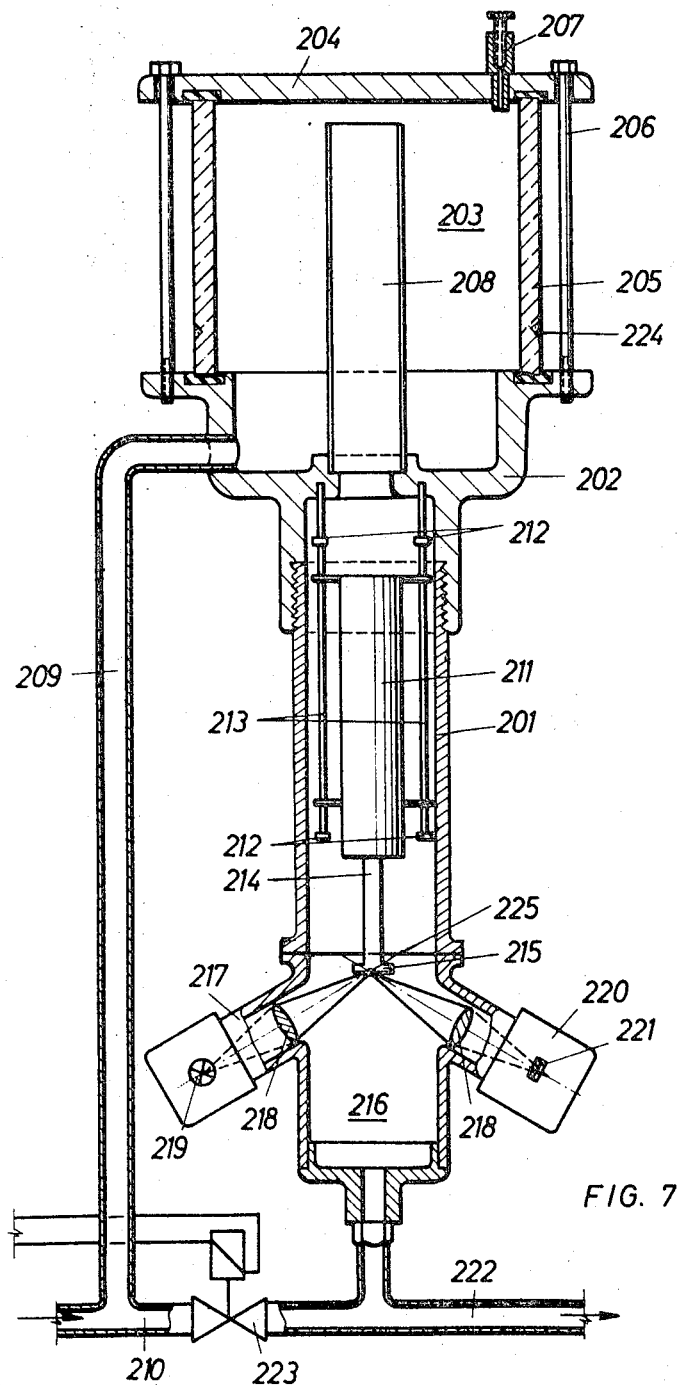
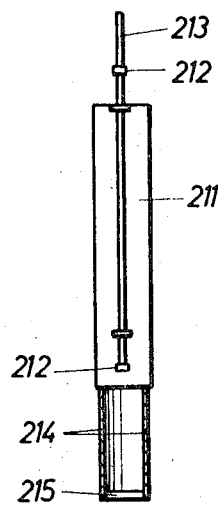
FIG. 7
FIG. 8

3,564,910
LIQUID METERS
Walter Wiegmann, 42 Hermann Simonstrasse,
483 Gutersloh, Westphalia, Germany
Continuation of application Ser. No. 626,440, Mar. 28,
1967. This application June 16, 1969, Ser. No. 835,901
Int. Cl. G01f 1/00
U.S. Cl. 73—194                     4 Claims

ABSTRACT OF THE DISCLOSURE

A liquid flow-meter, e.g. for determining the fuel consumption of internal combustion engines, has a measuring vessel from which the liquid is discharged, with calibration marks, and a float in the measuring vessel which, depending on the specific gravity of the liquid floats more or less submerged in the liquid. When the float passes a first calibration mark as the liquid level is falling, at which time there is a known weight of liquid surrounding the float, a timing device is started, which is stopped as the float passes a second calibration mark, thus giving the time taken for a given amount of liquid to flow out of the measuring vessel. The passage of the float past the calibration marks may be determined by means of light beams and photoelectric devices.

---

This application is a continuation of my co-pending application Ser. No. 626,440, now abandoned, filed Mar. 28, 1967.

The invention relates to an automatic consumption meter for liquids, more particularly for determining the fuel-consumption of internal combustion engines, heating apparatus or the like in terms of weight.

For determining the weight of fuel consumed, hitherto manually operated appliances have been used, in which the weight of the liquid is determined by weighing the fractional parts thereof. This method is not only very time-consuming and complicated and therefore expensive, but also it is unreliable and does not suffice for a desired exact determination of the weight for a continuous measurement check.

The known arrangements for automatic liquid measurement serve for determining the volume of a flowing liquid. A measuring vessel is used, the contents of which between two calibration marks is measured, and in which the movement of the liquid level past the calibration marks is automatically transmitted by electrical means directly to a stop-dial to start or stop it and is further transmitted for the operation of measuring-instruments.

It is further known, with a volumetric liquid meter, to effect the indication of the progress of the liquid-level, after the flowing of the liquid through a reservoir tank and through the measuring-tank, by means of the position of the gauge level which concludes the measuring-process by the reflection of a beamed ray of light onto a photocell in a photohead which photohead has two arms, standing opposite one another at an angle, for accommodating the light-source and the photocell. This takes place with simultaneous switching off of the stop-dial which is switched on by an operating-key at the beginning of the measuring-process, by means of the current-impulse sent from the photocell through an amplifier, as well as at the same time the switching on of an actuation device for opening a pilot-valve closed at the beginning of the measuring-process and positioned in the reservoir tank, for the purpose of after admission of the liquid accumulated in the reservoir tank into the calibrated section.

The determination of the consumption-volume is in many cases inadequate and does not serve the desired consumption-determinations. For example, the fuel-consumption in internal combustion engines is generally defined by grams per horsepower or by milligrams per stroke, i.e. by weight. For this purpose there is needed a specially provided weighing machine. The weighing method is however very expensive, particularly for small meters. With small consumption a fairly long measuring period cannot be avoided, if errors of measurement are to be kept as small as possible.

The volumetric measuring-method, on the other hand, necessitates a conversion of the volume with consideration of the specific weight, in order to determine the weight of the fuel. These measures always have to be repeated when the quality of the fuel is changed or an alteration occurs to the temperature of the fuel. This is the case, when, for example, cold fuel from an underground tank is used for filling up the so called day-tank for the testing benches. In this case the residue in the day tank has, because of the heat in the room, a higher temperature and thus a lower specific gravity.

The invention is based on the object of determining, by means of a preferably automatically operating device, the weight of a liquid, e.g. the fuel consumed in internal-combustion engines, heating apparatuses and the like with consideration of the fluctuation in the specific gravity of the liquid which is to be measured.

According to the invention a float is arranged in the measuring-vessel, which depending on the specific gravity of the liquid is more or less immersed in the liquid, when the float begins to float, with the lowering of the liquid-level, the passing of the upper-end of the float by a first calibration mark actuating the starting of the time-measurement. At this moment there is, around the float, a known weight of liquid. The time-measurement is terminated when the liquid-level of this liquid-quantity of known weight passes a calibration mark which is so arranged that with the passing of this mark always the same weight of liquid has flowed through.

In this arrangement the measuring cylinder with the built-in float is arranged between an upper photo-head, the upper photo-head serving for the scanning of the upper auxiliary surface of the float, and the lower photo-head serving for the scanning or indication of the main-liquid surface in the gauge level. Such a liquid consumption motor is preferably characterized by the feature that the auxiliary surface mounted on the upper extremity of the float has the form of a small pan for receiving a thin film of the liquid which is to be measured. Furthermore, the consumption meter is preferably characterized by the feature the two-fold axial guidance of the float inside the measuring cylinder, with the upper guide encircling the float and the lower guide engaging a lengthening-rod fixed to the float, which rod is provided with a stop for preventing the rise of the float to the surface.

Another embodiment is characterized by the feature that the photoelectric scanning occurs from below with regard to the liquid-level or with regard to the polished surface of an auxiliary surface lying in the liquid, which auxiliary surface is mounted on the lower extremity of the float, one single photo-head for the auxiliary surface as well as for the main liquid-level serving the lowering of the auxiliary-surface, for the photoelectric scanning at the point of intersection of the optical axes inclined at an acute angle to the horizontal. In this arrangement the auxiliary surface is arranged between two support-bars fixed to the float whose distance from each other is sufficient to allow the beamed ray of light to pass out from the light-source.

The consumption meter can also be characterized by the feature that the float is guided axially on two bars provided with upper and lower stop collars, which bars are fixed to the casing and project into the measuring cylinder. Another embodiment is characterized by the feature that the inflow of the fuel into the measuring-cylinder takes place from below through the inlet-pipe with a solenoid valve being inserted between inlet-pipe and outlet-pipe, which valve is controlled by the switch-apparatus and can interrupt the liquid-flow to the outlet-pipe, and furthermore that a liquid-storage pipe arranged by the side of the measuring-cylinder, is connected at its upper extremity with the side of the reservoir-tank casing and its lower end to the inlet-pipe.

The great advantage of the invention is based on the fact that, with this same apparatus, the consumption of liquids of varying specific gravity are directly determined according to weight, with the specific weight or the temperature being automatically taken into account. The fuel-consumption meter can therefore also be used as a filling device for filling-materials, for containers which offer as regards their weight.

Generally, the invention can also be used in the known random tests and all the liquid-meters according to the volumetric measuring-system, in which the liquid-level moves past an upper and a lower calibration-mark, upwards or downwards, in order to determine the consumption. It does not matter, in this arrangement, whether the movement past the calibration marks is observed with the eye or through technical means and is determined manually or automatically by a dial or the like.

The invention is not restricted to the use of the float in apparatus in which the liquid-level is scanned photoelectrically from above. The invention rather makes possible, with the aid of the measuring float, the photoelectric scanning from below, with regard to the liquid level or with regard to the polished surface of an auxiliary lying in the liquid. In this arrangement the auxiliary surface is mounted on the lower extremity of the float, while the upper liquid pan which is necessitated in the photoelectric scanning from above, is not needed.

It must be considered that in contrast to the highly fluid fuels, in the special viscous fuels small air bubbles, trapped in the liquid on account of the quite great friction, rise slowly to the surface. The transparency of these fuels allows, therefore, in consumption-meters, the photo-electric scanning, from below, with regard to the liquid-level or with regard to the polished surface of the auxiliary surface lying in the liquid.

In this constructional example of the invention the apparatus is shown in a simple clear construction. All mixing of the fuel with air during the re-filling of the measuring-cylinder, after the measuring of the consumption, is avoided when the fuel flows from below into the measuring-cylinder and the air column is compressed, without turbulence, through an air-reservoir pipe into the reservoir-tank at the highest point of the consumption meter. During this process the air-bubbles, trapped in the fuel and flowing upwards with the fuel in the same direction, are removed from it and collect in the air-chamber of the reservoir tank.

The filling of the consumption-meter or of the measuring-cylinder with fuel rising from below makes possible the arrangement of the apparatus in such a way that the consumption-meter, after a re-filling following a terminated measuring, has, no longer, fuel passed through it which is flowing to the testing engine, during the resting-periods between the individual consumption-measurements, therefore, the trapped air-bubbles have the opportunity to escape from the fuel which is in a state of rest, and to collect in the reservoir tank. For the following consumption-measurement, therefore, air-free fuel is provided. The invention is therefore particularly suitable for the testing of multifuel engines which can be operated alternatively by petrol or diesel oil. The characteristic of these engines, of conveying large quantities of air into the fuel circulation, made accurate consumption-measurements, with the known measuring devices, hitherto very difficult.

The constructional form of the invention, here described, can be used with a photohead for the determination of the weight of the fuel consumption. Moreover, the use of a solenoid valve such as is necessary for filling from above, can be dispensed within this arrangement.

The apparatus can be used with two photoheads for the volumetric measurements.

With the employment of three photoheads, the apparatus can be used for volumetric measurements in three measuring ranges. With the volumetric measurement merely the float is dispensed with.

The scanning of the liquid level from below is very effective on account of the total reflection of the light, because no light from a dense medium penetrates through to the upper surface at an angle smaller than 45°.

The invention is described as follows with reference to the constructional examples depicted in the accompanying drawings, in which:

FIGS. 1–3 are diagrammatic views of three measuring cylinders with different amounts of liquid and with a float placed inside.

FIGS. 4–6 are views partly in cross section and partly in elevation of the consumption-meter in three different stages of the measuring process, with scanning of the measuring-level from above.

FIG. 7 is a view partly in cross section and partly in elevation of the consumption meter with the device for scanning the measuring-level from below and filling-up of the measuring cylinder from below.

FIG. 8 is a view of the float with a support means for the construction shown in FIG. 7.

FIG. 1 shows a cylinder M with diameter D. filled with a liquid of specific gravity V, in which there is a cylindrical float with diameter $d$ and weight GS. When this float is immersed to a distance $h1$, $$\frac{h, d^2 \pi V}{4} = GS \qquad GM = \frac{(D-d^2)h, V}{4} = \text{weight}$$

Figure 5:
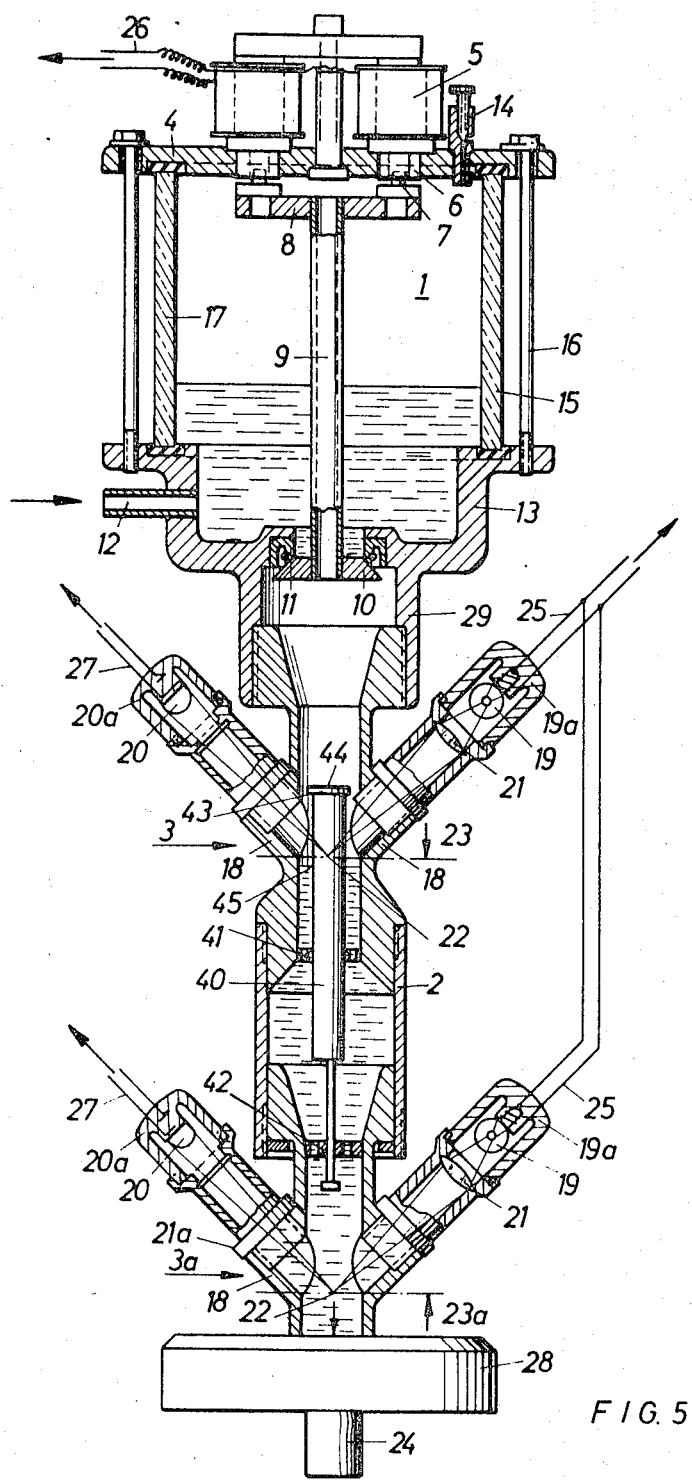

$$GM = \frac{(D^2 - d^2)}{d^2} = GS$$

It is thus shown that around the float in its area of immersion, a quantity of liquid of uniform weight is always present, determined through the weight of the float and the diameters of the measuring-cylinder and float and without consideration of the specific gravity of the liquid.

FIG. 2 shows how this principle is used according to the invention. When the measuring-cylinder M is filled with liquid, and this liquid is fed out through the pipe A, there is, with the passing of the calibration mark by the upper extremity of the float of length L, always a quantity of liquid uniform weight (cross-hatched) around the float, i.e. between the liquid-level V and the lower extremity of the float. When the second calibration mark 11 lies at a distance L below, the calibration mark 1, then with the passing of the second calibration mark by the liquid level V, the quantity of liquid of known weight has flowed through. It must be determined when the upper end of the float or an element fixed firmly to it, passes the first calibration mark and after that when the liquid passes the second mark, with the distance between these marks being the same as the distance between the upper and lower extremities of the float.

Since the float sinks with the liquid-level, it is advisable to place the second calibration mark lower, because only then it is possible to observe the passing of the liquid-level with the aid of reflected rays of light. Such a situation is given in FIG. 3; here the dimensioning of the measuring-cylinder is to be such that the volume between the theoretical position of the calibration mark IIth and the actual position of the calibration mark II (simply-hatched in the figure) in the measuring-cylinder along the float is taken out as shown in FIG. 3.

The consumption-meter (FIGS. 4–6) consisting of a reservoir-cylinder or tank 1, a measuring-cylinder or tank 2 and a photohead 3, 3a, can be operated in any known way on a common apparatus-panel with the amplifier for the stop-dial, together with the scanning device or also separated from the latter, as described above. The units are in each case connected together by electrical conductors.

A magnetic system 5 is built into a cover 4 of the reservoir-tank, which magnetic system projects into the inside of the tank with its two free poles 6 sealed off when they pass through the cover 4. Pins 7 of a pole yoke 8 are guided inside the poles 6, by which there is avoided a tilting, at the bottom of the reservoir tank, of a valve disc 10, which is carried by a hollow shaft 9. The valve-disc bears against a valve-seal 11. Inlet 12 is fixed in a lower part 13 of the reservoir-tank 1. In the cover 4 there is a screwed in air-valve 14 which makes possible the adjustment of the fuel-level in the lower part of the tank to a specific height, e.g. up to mark 15. The hollow valve shaft 9 serves for the transfer of air between reservoir-tank 1 and measuring-cylinder 2.

Between the cover 4 and the lower part 13 of the reservoir-tank 1, a storage cylinder 17 is clamped hermetically by means of a screw 16. With the passing of the current through the magnet system 5, the valve-disc is pulled tightly against the valve-seat 11 by the valve-shaft 9. The capacity of the measuring-cylinder 2 between the reservoir tank 1 and the photohead 3 is limited to a specified volume. The photohead 3, which is screwed hermetically into the upper part of the measuring cylinder 2, has the two screw sockets 18 which are opposite to one another, and which are at a specified angle to the longitudinal axis or verticals. The two sockets 18 serve for receiving a lamp 19 and a photocell 20 respectively together with their holders 19a and 20a. In front of the lamp 19 is placed a lens 21 which beams the light in such a way that it is focused, in the axis of the measuring cylinder, at a point 44 or 22. On reaching fuel-level 23, the ray of light is reflected from point 22 into the photocell 20. Lens 21 and glass 21a are fixed hermetically in the holders 19a and 20a. Both the pieces of glass, therefore, do not come into contact with the liquid.

Underneath the measuring cylinder, the second photohead 3a is screwed in and sealed hermetically. To it there is attached a storage tank 28 with an outflow-connection 24 which is connected to the engine by the fuel-pipe.

Leads 25 of the lamp-holder 19a and leads 26 of the magnet 5 lead to the electrical push switch which is, at the same time, connected with a stop-dial. Leads 27 of the photohead are guided through the amplifier to the automatic switch which operates the switching-off of the current flowing in to the leads 25 and 26. In the measuring cylinder 2, a float 40 is built in, which is kept in its longitudinal axis by guiding-pieces 41 and 42. The upper extremity of the float 40 is provided with a small pan 43. Inside the latter there is necessarily accumulated, taking into consideration the method of operation of the fuel consumption meter a thin film of the liquid which is to be measured, and thus there is formed the upper auxiliary surface 44.

The constructional form of the fuel consumption-meter according to FIG. 7 is as follows:

A calibrated measuring cylinder 201 is hermetically screwed into a casing 202 of a reservoir tank 203. Between a cover 204 and the casing 202 there is a glass cylinder 205 clamped hermetically by anchor-screws 206. In the cover 204 there is an air-valve 207. Into the reservoir tank 203 projects an air-storage pipe 208, which connects the measuring cylinder 201 with the reservoir tank 203.

The upper extremity of a liquid storage-pipe 209 opens laterally into the inside of the casing, and the lower extremity of the pipe is connected with an inflow pipe 210.

A float 211 moveable along the longitudinal axis of the measuring-cylinder is guided on two guiding-bars 213 provided with upper and lower stops 212. Two carriers 214 for an auxiliary surface 215 are fixed to the lower extremity of the float in such a way that a beamed ray emitted from a lateral light-service can pass through between the carriers 214 (FIG. 8). The auxiliary surface 215 consists of material whose underside is polished for the reflection of the light ray.

There is a single photohead 216 at the lower end of the measuring-cylinder. A tubular supporting-piece or arm 217 inclined at an acute angle to the horizontal on the left side of the photohead 216 is sealed off from the fuel by a lens 218. In the inside there is a measuring-lamp 219 which is connected electrically with a switch apparatus. Inside a supporting piece or arm 220 inclined at the same angle on the right side of the photohead 216 there is accommodated a photocell 221 which is likewise connected by cables with the switch apparatus.

The lower extremity of the photohead 216 is connected with an inlet-pipe 222 which loads to the testing-engine. Between the inlet and outlet pipe there is built in a solenoid-valve 223 which is controlled by the switch-apparatus and can interrupt the flow to the outlet pipe 222.

The measuring process with the fuel consumption-meter for the determination of the weight of the consumption is analogous to that of the fuel consumption meter for volumetric measurement.

Figure 6:
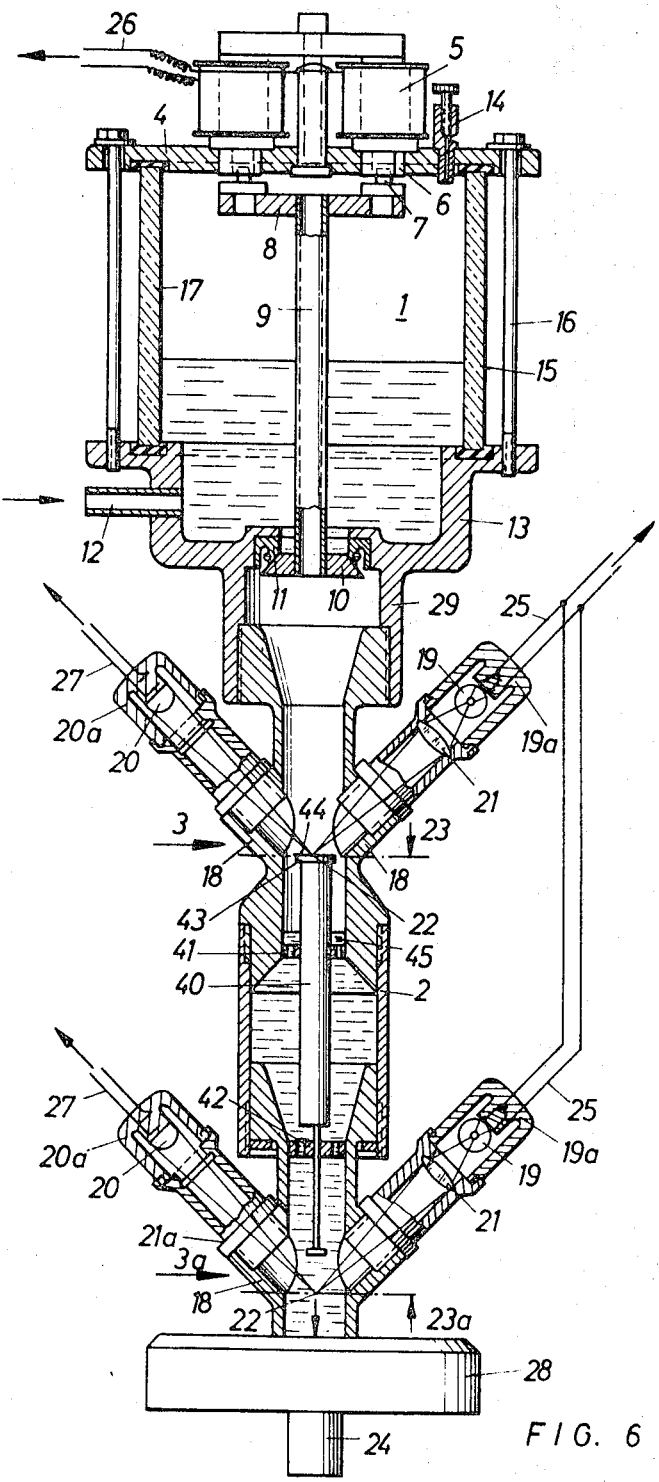

The method of operation with the constructional form exemplified in FIGS. 4–6 is as follows:

By pressing the actuation-switch, electric current flows from the amplifier through the leads 25, 26, which current, during the whole measuring-process, closes the valve 10 through the magnet system 5, and at the same time lights up the two lamps 19 in the upper and lower photoheads 3 and 3a. The flow of fuel through the apparatus is interrupted by the closed valve 10. Underneath the valve 10 the fuel sinks corresponding to the consumption of the engine on test. The air transfer between the reservoir-tank 1 and measuring cylinder 2 takes place through the hollow valve-shaft 9. An equal quantity of fuel is accumulated inside the reservoir-tank 1. The liquid-level 45 sinks and consequently at a certain moment the float 40 (FIG. 1) lying, when the calibrated section is filled, against its upper limits and fully immersed, becomes freed (FIG. 2) and sinks with the liquid.

As described with the aid of the FIGS. 1–3, there is in this arrangement, a quantity of liquid of known weight surrounding the float. The small pan 43 on the upper extremity of the float 40 is necessarily filled with liquid and thus forms the auxiliary surface 44. The main surface-level 45 cannot be scanned by the point of light on passing through the gauge 23 of the upper photohead 3, since the float 40 covers this point of light. Only when the auxiliary surface 44 reflects the point of light into the photocell 20 of the upper photohead 3, is the stop-dial started by the weak current generated here through the amplifier device. With this the influence of the auxiliary surface 44 on the consumption-measurement is ended. The main surface-level 45 of the fuel, which sinks further down, after passing out of the measuring cylinder 2 flows finally through the gauge-level 23a in the lower photohead 3a. Through the reflection of light onto the photocell 20 the progress of the stop-dial is, through the amplifier apparatus brought to a halt, the valve 10 is opened and the lamps 19 are switched off. The measuring cylinder 2, is after a short time, refilled by the fuel accumulated in the reservoir-tank 1.

By timing the period between the progress of the auxiliary surface 44 through the upper gauge-level 23 and the progress of the main surface-level 45 through the lower gauge-level 23a, the exact consumption per hour of the testing meter can be directly determined according to weight.

The method of operation of the fuel consumption meter in the embodiment according to FIGS. 7 and 8 is as follows:

The consumption meter is connected with its fuel inlet-pipe 210 to e.g. a high positioned tank and its outlet pipe 222 is connected with the engine that is to be tested. Through the inlet-pipe 210 and the open solenoid valve 223, fuel flows into the outlet-pipe 222 and to the engine. At the same time the liquid-storage pipe 209 and the measuring-cylinder 201 are filled from below. Both liquid levels lie equally high after settling, since there is a connection with the measuring cylinder 201 through the air storage pipe 208 in the reservoir tank. The air expelled from the fuel which has flowed into the liquid storage-pipe 209 and into the measuring-cylinder 201, forms an air cushion inside the reservoir tank 203, which air cushion can be reduced by opening the air-valve 207, when this is necessary through the line pressure being too small. With the aid of this air-valve 207, the liquid position of the liquid in the reservoir-tank 203 is brought up a full mark 224. With a high line pressure, which with the filling of the consumption meter, already exceeds weight of the full-level 224, the position of the liquid in the reservoir tank 203 can be lowered to the full-mark 224 through the injection of a short blast of compressed air. The float 211 movable along the longitudinal axis of the measuring-cylinder 201 lies, because of its upthrust, with its upper guides against the stops 212 on the guiding bars 213.

The fuel consumption-meter is set in motion by pressing a testing-key. The testing-key operates, through the switch-apparatus, the closing of the solenoid valve 223 and the lighting up of the measuring lamp 219.

The flow from the tank into the outlet-pipe 222 is now interrupted. Consequently, now only fuel from the measuring-cylinder 211 can arrive at the engine through the outflow-pipe 222.

Inside the partly filled storage-pipe 208, and then inside the measuring-cylinder 201, the fuel-level corresponding to the engine consumption begins to sink. Through this the air compressed inside the reservoir tank becomes less, which has the result that fuel in an equal quantity flows through the liquid-storage pipe 209 into the reservoir tank 203, whose liquid-level position rises correspondingly.

When the float 211 begins to float in the sinking liquid, there is a known quantity of liquid around the float. The passing of the auxiliary surface 215 along the point of intersection of the optical axis 225 initiates the starting impulse for the timing-device; the float sinks down to the lower stops 212. The ray of light can now pass through unhindered between the two carriers 214 of the auxiliary surface 215. The further falling surface of the liquid column now reaches, with its own underside, the point of intersection of optical axes 225. Through the total reflection, the ray of light impinging on the liquid level from below is deflected into the photocell 221. The weak current generated here, which is amplified in the switch-apparatus, gives a second impulse, which stops the dial, switches off the measuring lamp 219 and opens solenoid valve 223, through which the fuel now flows again directly to the engine. At the same time the measuring-cylinder 211 is filled up again from below and the fuel accumulated in the reservoir tank 203 during the measurement flows, meeting the new inflow of fuel, through the liquid storage pipe 209 and arrives, through the solenoid valve 223 and the outflow pipe 222, at the engine.

The position of the fuel level in the reservoir-tank 203 is adjusted, according to the principle of the communicating pipes, automatically back up to the full-mark 224. Then the fuel-consumption-meter is again ready for measurement.

In the implementation of the principle of the invention, the mounting of the measuring apparatus can also differ from the illustrated and described constructional examples. Thus, for example, there is possible and the direct mounting into the outlet-pipe from the higher-positioned tank to the engine in a simple way and dispensing with the upper reservoir-tank, a pipe-guide to the upper tank chamber serving for the aerating of the measuring chamber.

Also, the apparatus according to the invention can be manually operated.

Instead of the float, another movable part can be used, just as in place of the described float guide and holder, another suitable device can also be used.

I claim:

1. An assemblage for automatically determining the fuel consumption of internal combustion engines, heating apparatus and like equipment, independently of the specific gravity of the liquid, comprising a reservoir for the fuel to be measured and having a volume of air therein, said reservoir having an outlet, magnetically controlled valve means for opening and closing said outlet, a measuring cylinder below and in communication with said outlet, an outlet conduit communicating with said measuring cylinder, said reservoir and measuring cylinder being located in a fuel line between a fuel source and point of utilization, said valve means including a hollow stem providing communication between the upper portion of the reservoir and the measuring cylinder whereby the volume of air of the reservoir for greater than that of the measuring cylinder, a photohead for said outlet conduit including two oppositely disposed tubular arms, a photocell in one arm, a light source in the other arm, means mounting said arms at a sharp angle symmetrically with respect to the mid-axis of the measuring cylinder and the direction of flow of the fuel to be measured, electrical circuits for said light source and said magnetically controlled valve means, an operating key in said circuits for closing the valve means and energizing the light source, a timer, an electric circuit for said photocell leading to said timer for starting and stopping the timer, a float in the measuring cylinder having a quantity of fuel of uniform weight thereabout between the fuel level and the lower end of the float which, by the height of its projection out of the fuel, makes possible the measurement in the measuring cylinder of always the same weight of fuel, a reflecting surface for the float for directing a light ray from the light source to the photocell as the float moves downwards past a calibration mark for the measuring cylinder, the photocell thereby starting the timer, and the light ray again being directed to the photocell by reflection from the surface of the fuel after a given quantity of fuel has flowed from the measuring cylinder, thereby causing the timer to be stopped, the valve means to be opened and the light source to be de-energized.

2. The assemblage as claimed in claim 1, and including two photoheads arranged one above the other, with the upper photohead being actuated by reflection from the upper end of the float for starting the timer and the lower photohead being subsequently actuated by reflection at the surface of the fuel for terminating the measuring operation.

3. The assemblage as claimed in claim 1, in which the float is guided in the measuring cylinder by an upper guide surrounding the float and a lower guide surrounding a rod depending from the float and having a stop to limit the upward movement of the float.

4. An assemblage for automatically determining the fuel consumption of internal combustion engines, heating apparatus and like equipment, independently of the specific gravity of the liquid, comprising a measuring cylinder, a liquid fuel inlet at the bottom of the measuring cylinder, a reservoir above the measuring cylinder, a fuel line between a fuel source and a point of utilization, a branch from the fuel line to the reservoir, a branch from the fuel line to the liquid fuel inlet of the measuring cylinder, a magnetically controlled valve in the fuel line between the two said branches, a float in the measuring cylinder having a quantity of fuel of uniform weight thereabout between the fuel level and the lower end of the float which, by the height of its projection out of the fuel, makes possible the measurement in the measuring cylinder of always the same weight of fuel, a photohead including two tubular arms symmetrically disposed on opposite sides of the measuring cylinder at acute angles to the axis thereof, a photocell in one arm, a light source in the other arm, electric circuits for the light source and the magnetically controlled valve, a timer, an electric circuit for the photocell leading to the timer for starting and stopping same, an operating key for completing the circuits to the light source and the valve for operating the light source and closing the valve, a reflecting surface for the float for reflecting light from the light source to the photocell as the float drops while fuel in flowing out of the measuring cylinder after the closing of the valve, so as to start the timer, with light being again reflected to the photocell by the surface of the fuel in the measuring cylinder after a known quantity of fuel has left the measuring cylinder for stopping the timer, de-energizing the light source and opening the valve means for permitting fuel to flow directly to the point of utilization and into the measuring cylinder to refill same.

References Cited

UNITED STATES PATENTS 3,234,784   2/1966   Wiegmann _____ 73—113

FOREIGN PATENTS 410,194   3/1945   Italy _____ 250—218
417,808   10/1934  Great Britain _____ 250—228

RICHARD C. QUEISSER, Primary Examiner
J. K. LUNSFORD, Assistant Examiner